No. 785,545. PATENTED MAR. 21, 1905.
W. G. GADUE.
FLOUR SIFTER.
APPLICATION FILED JUNE 12, 1902.
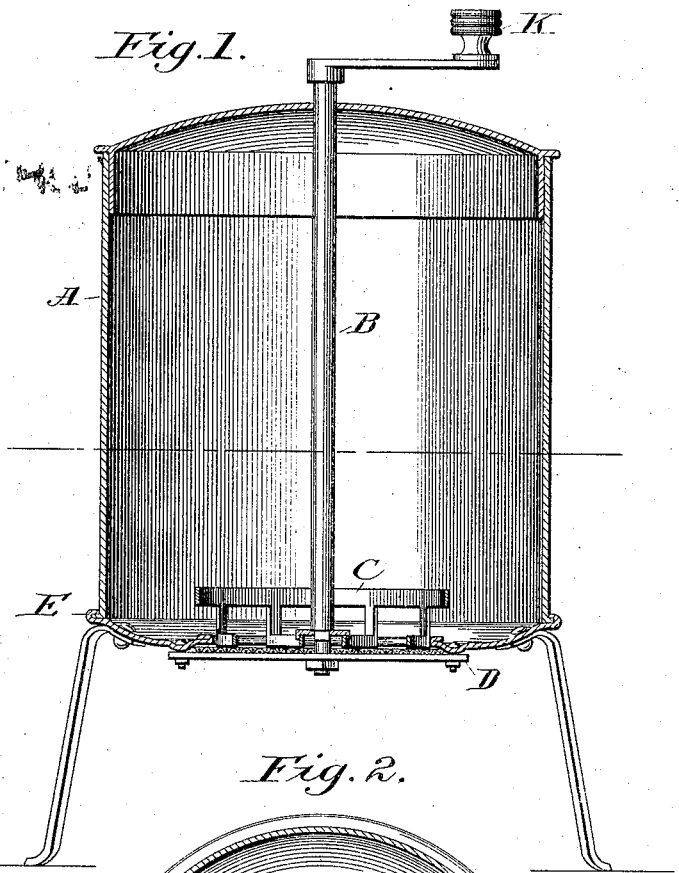
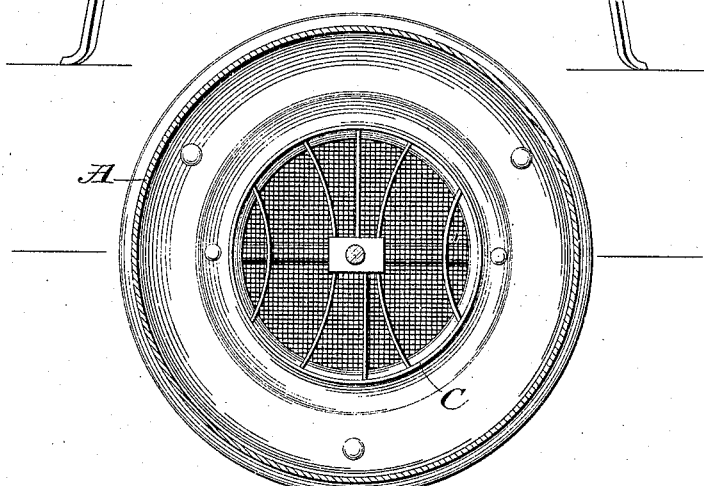
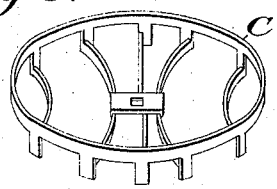
Witnesses:
James C. Kelley
Marie H. Kennedy
Inventor:
William G. Gadue
By his attorney
George N. Kennedy No. 785,545.

Patented March 21, 1905.

UNITED STATES PATENT OFFICE.

WILLIAM G. GADUE, OF BURLINGTON, VERMONT.

FLOUR-SIFTER. REISSUED

SPECIFICATION forming part of Letters Patent No. 785,545, dated March 21, 1905.

Application filed June 12, 1902. Serial No. 111,307.

*To all whom it may concern:*

Be it known that I, WILLIAM G. GADUE, a citizen of the United States, residing in the city of Burlington, in the county of Chittenden and State of Vermont, have invented a new and useful Improvement in Dustless Flour-Cans and Flour-Holders, of which the following is a specification.

My invention consists of a flour can and holder for household use where flour can be kept free from dust and other objectionable things and when any is wanted for use, ever so small or large a quantity, it can be sifted into any receptacle desired. The can or holder is made of tin or other metal, holding from twenty to fifty pounds of flour, with no openings except at the top, which is closed by a cover. At the bottom a sieve is firmly soldered with a slight ridge around the edge of said sieve.

Figure 1 is a vertical sectional view of the device. Fig. 2 is a horizontal section, and Fig. 3 is a perspective view, of the agitator.

In the accompanying drawings similar letters refer to similar parts of this invention.

A is a can made from a piece of tin or other metal rolled up to form the body thereof all the way of the same size. At the bottom is another piece fastened to this by a locking-seam E and not soldered, making a beveled piece about one and one-half inches deep. A sieve D is soldered onto the bottom of this piece on the outside with a slight rim around the edge, and this is on the inside of the can and slightly raised above the surface of the same. The sieve is in a circle, and around the rim aforesaid is about half of an inch of width between the sieve and the beveled piece, forming a gutter *a a* around the sieve.

B is a shaft with a crank in the top K, and C is an agitator attached to the lower end of said shaft. Said shaft is attached to said agitator in the center with a loose joint. Said agitator bears on the rim aforesaid—that is, it works on the slightly-raised edge that is around the sieve. The agitator C has curved spokes and also has the two opposite sides broken away, as appears in Fig. 2. Each spoke is bent up at each end where it is attached to the periphery or rim of the agitator, so that the rim aforesaid is about half an inch above the bottom of the can and the sieve. It will be observed that this raising of the rim of the agitator about half an inch above the bottom by the ends of the spokes being bent up as aforesaid leaves ample room under this rim for lumps and all undesirable objects to be thrown out by the spokes as the agitator is revolved, throwing them under the rim into the gutter. This is greatly facilitated by the two sides of the agitator being broken away, as shown in Fig. 3. This agitator C is of cast-iron, the rim and spokes cast in one piece.

After a series of experiments it was found that the breaking away of the sides of the agitator and the raising of the rim by the bent-up ends of the spokes gave the perfect work of throwing all undesirable objects under the rim and out where the sides are broken away into the gutter, as herein described.

Fig. 3 shows how the rim of the agitator is raised up from the bottom by the bent-up ends of the spokes. It was found after many experiments that this peculiar shape of the spokes—namely, being bent up at each end, so as to make about half an inch between the periphery or rim of the agitator and the little ridge around the outer edge of the sieve—was necessary in order to do good work. It will be observed that the agitator C rests on this little ridge, so that the curved spokes thereof have this ridge for a bearing, and this keeps the spokes from touching the sieve, although it comes very close to the same; but the outer rim or periphery being raised up from the bottom by the bent-up ends of the spokes makes room for all lumps and undesirable objects to be thrown by the agitator under the rim into the gutter *a a*. Ordinarily this gutter is half an inch or more in width between the raised ridge aforesaid that surrounds the sieve and the beveled outside of the lower portion of the can; but this width can be varied when it is desired. The shaft B is journaled at the upper end in the cover G.

The operation of this holder and sifter is, first, to put in the shaft B with the agitator attached to the lower end by a loose joint, then put in the flour. The cover is then put on with the shaft B through the middle, and the crank K goes on by the square end of the shaft fitted into a like-shaped orifice in the end of the crank. Now the flour remains secure in the can. None will leak or scatter out. A plate or a pan is sometimes set under the bottom, but ordinarily it is not necessary. When flour is wanted, a touch upon the crank will bring out just the quantity desired, whether large or small. It will fall into any receptacle that may be placed under the bottom. It will be seen by the Fig. 1 that this holder is usually upon legs—three or four legs. No impurities will go through the sieve, but all will be thrown into the gutter. After two, three, or more canfuls of flour have been sifted, it may be found advisable to take out the shaft and agitator and empty the can before putting in any more, which may be done in a few moments; but worms and bugs in the gutter remain there until removed. The agitator does not touch anything in the gutter after once throwing it there. Worms and bugs are not ground up or mixed with the flour. Once thrown into the gutter there they remain till the can is emptied as aforesaid.

As a holder this is a very convenient receptacle for keeping flour safely from dust, flies, rats, mice, and all vermin, and at the same time when any is wanted a slight touch upon the crank brings out just the quantity desired. As already described, the agitator C bears on the little ridge that surrounds the sieve, and when a quantity of flour is first put in the weight of the flour causes it to move not so easily at first; but very soon the flour will work under the agitator, so as to lubricate the same and make it go much more easily. Fig. 3 shows how the ends of the spokes are bent up.

What I claim as my invention, and desire to secure by Letters Patent, is—

A receptacle having a screen at the bottom, and an outlying surrounding gutter for the reception of refuse, said receptacle provided with an agitator moved by a crank connected with a shaft loosely attached in the middle of the same, said agitator having curved bars on the under side of the same, and on each side of the shaft whereby open-ended spaces are formed for the passage of refuse, said refuse going under the rim which is raised on the bent-up ends of said curved spokes a little above the screen aforesaid as herein described.

WM. G. GADUE.

Witnesses:
   JOHN S. WILKINS,
   MARGARET M. HICKEY.